E. LUDDE.
INSECT POWDER SPRAYER.
APPLICATION FILED AUG. 27, 1908.
921,422.
Patented May 11, 1909.
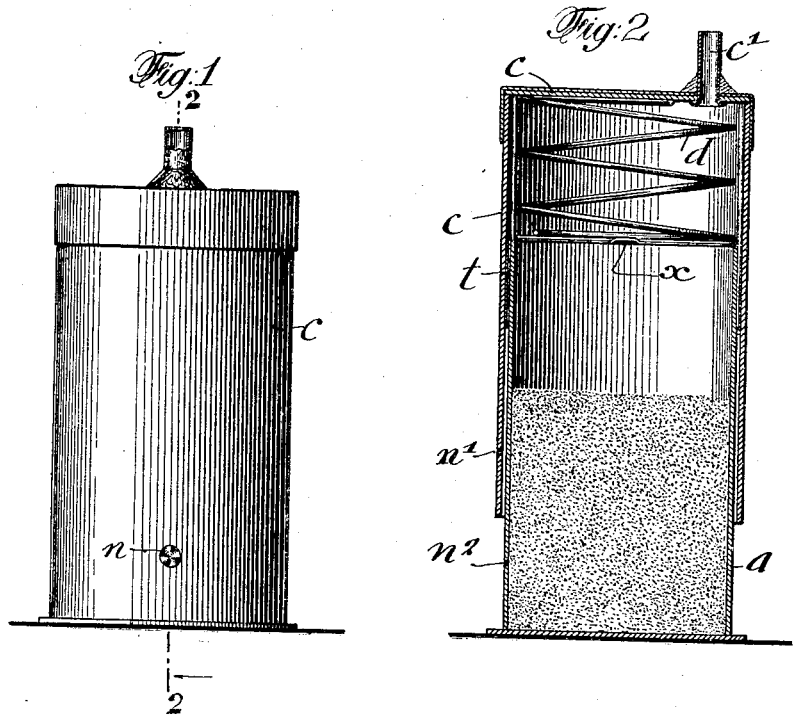
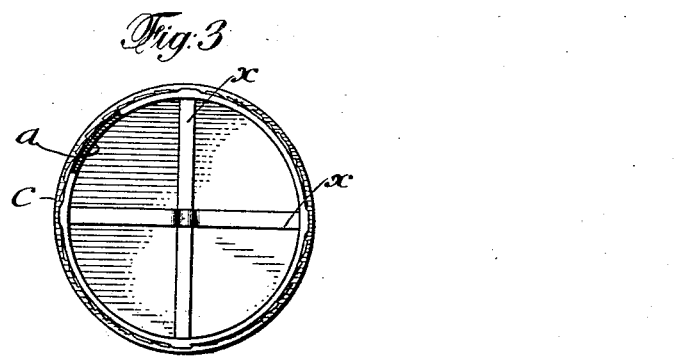
Witnesses:
Inventor
Elard Ludde
By his Attorneys

UNITED STATES PATENT OFFICE.

ELARD LUDDE, OF NEW YORK, N. Y.

INSECT-POWDER SPRAYER.

No. 921,422.     Specification of Letters Patent.     Patented May 11, 1909.

Application filed August 27, 1908. Serial No. 450,526.

*To all whom it may concern:*

Be it known that I, ELARD LUDDE, a citizen of the United States of America, residing at New York, in the borough of Queens and State of New York, have invented certain new and useful Improvements in Insect-Powder Sprayers, of which the following is a specification.

This invention relates to an improved sprayer or blower for insect powder, which is so constructed that a certain quantity of insect powder is furnished with the receptacle and means for blowing or spraying the powder so as not to require the refilling of an independent blower, the whole being furnished in a cheap, convenient and easily applied manner; and the invention consists of an insect powder sprayer comprising a tubular receptacle for the insect powder, crossed supporting members at the upper end of the receptacle, a tubular cover sliding over the receptacle, which cover is closed at the top and provided with a spray-nozzle, and a helical spring interposed between the top of the cover and the crossed members of the receptacle, as will be fully described hereinafter and finally pointed out in the claims.

In the accompanying drawing, Figure 1 represents a side-elevation of my improved insect powder sprayer, Fig. 2 is a vertical central section of the same on line 2, 2, Fig. 1, and Fig. 3 is a horizontal section with the spring removed.

Similar letters of reference indicate corresponding parts.

Referring to the drawing, $a$ represents a tubular receptacle, which is filled with insect powder. The receptacle $a$ is preferably made of pasteboard and closed at the bottom and open at the top. The receptacle is provided at the upper end with a cross $x$ made of crossed members of pasteboard, that is attached at its ends to the rim of the receptacle $a$ and serves for supporting the lower end of a helical spring $d$, which is interposed between the cross and the closed top of an outer telescoping cover $c$, which is closely fitted to the exterior of the receptacle $a$. To the rim of the receptacle $a$ is applied a layer $t$ of tissue-paper, which serves as a packing between the receptacle and the cover so as to prevent the powder from escaping through the narrow space between the receptacle $a$ and the cover $c$ sliding thereon. The cover $c$ is closed at the top and provided with a spray-nozzle $c^1$ of suitable metal, which is applied by glue or otherwise to the top of the cover.

My improved insect powder sprayer is used as follows: The receptacle is filled with insect powder up to the rim. The helical spring $d$ is then placed in position on the cross $x$ of the receptacle and the cover then telescoped in downward direction over the receptacle. In using the sprayer, the bottom of the receptacle is placed against the palm of the hand, while the fingers take hold of the top of the telescoping cover, the sprayer being held in slightly downward, inclined position in such a manner that the nozzle is at the lowermost position. The fingers are pressed quickly on the spring-cushioned cover over the receptacle, so that on each motion a certain quantity of insect powder is ejected through the spray-nozzle, the powder being sprayed or blown through all the crevices and chinks so as to reach the bedbugs, cockroaches and other insects in their inaccessible hiding places.

The insect powder sprayer is sold with the insect powder, and supplied to the market by pushing the cover against the tension of the cushioning spring in downward direction and then passing a small nail $n$ through holes $n^1$, $n^2$ of the cover and receptacle so as to hold in this manner the cover tightly in locked position on the receptacle. When it is desired to use the insect powder sprayer the small retaining nail is removed by lifting it out of the holes in the receptacle and cover, so that the cover is raised by the tension of the spring and placed in position for actuating the sprayer and ejecting the insect powder from the same and injecting it into the place where it is to be transmitted.

Having thus described my invention, I claim as new and desire to secure by Letters Patent:

1. An insect powder sprayer, comprising a receptacle for the insect powder provided with crossed members at its upper end, a telescoping cover closed at the upper end and provided with a spray-nozzle, and a helical spring interposed between the crossed members and the top of the cover.

2. An insect powder sprayer, comprising a receptacle provided with crossed members at the upper end, an exterior layer of packing tissue-paper applied to the outer end of the receptacle, a telescoping cover closed at the top, a spray-nozzle attached to the top of said cover, and a helical spring interposed between the crossed members of the receptacle and the top of the cover.

In testimony, that I claim the foregoing as my invention, I have signed my name in presence of two subscribing witnesses.

ELARD LUDDE.

Witnesses:
 PAUL GOEPEL,
 HENRY J. SUHRBIER.